US008145015B2

(12) United States Patent
Li et al.

(10) Patent No.: US 8,145,015 B2
(45) Date of Patent: Mar. 27, 2012

(54) DEVICE, SYSTEM, AND METHOD FOR INDEXING DIGITAL IMAGE FRAMES

(75) Inventors: Jianguo Li, Beijing (CN); Tao Wang, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 944 days.

(21) Appl. No.: 12/109,730

(22) Filed: Apr. 25, 2008

(65) Prior Publication Data

US 2009/0269022 A1 Oct. 29, 2009

(51) Int. Cl.
G06K 9/60 (2006.01)

(52) U.S. Cl. ........................................................ 382/305

(58) Field of Classification Search .................. 382/305, 382/306
See application file for complete search history.

(56) References Cited

U.S. PATENT DOCUMENTS 7,310,589 B2 * 12/2007 Li ................................. 702/179

OTHER PUBLICATIONS

Heusch et al. "Local Binary Patterns as an Image Preprocessing for Face Authentication" IEEE conf. on Face and Gesture Recognition, 2006.*
Flickner et al. "Query by Image and Video Content: The QBIC System" IEEE, Sep. 1995, pp. 23-32.*
Rodriguez et al. "Face Authentication Using Adapted Local Binary Pattern Histograms" European Conf. on Computer Vision, 2006.*
Ojala Timo, Pietikäinen Matti, Mäenpää Topi, "Multiresolution gray-scale and rotation invariant texture classification with local binary patterns" 2002, vol. 24, n°7, pp. 971-987.
Valtteri Takala , Timo Ahonen and Matti Pietikäinen "Block-Based Methods for Image Retrieval Using Local Binary Patterns" Machine Vision Group, Infotech Oulu, PO Box 4500, FI-90014 University of Oulu, Finland, 2005.
Alan F. Smeaton, Paul Over, Wessel Kraaij "Evaluation campaigns and TRECVid" Special session 2: query systems for data retrieval in large personal image and video databases table of contents, pp. 321-330, Year of Publication: 2006.
Paul Over "TREC Video Retrieval Evaluation" Nov. 21, 2000.
Chapter 11 "Markov Chain" pp. 405-470 http://www.dartmouth.edu/~chance/teaching_aids/books_articles/probability_book/Chapter11.pdf, 2006.

* cited by examiner

*Primary Examiner* — Bhavesh Mehta
*Assistant Examiner* — Utpal Shah
(74) *Attorney, Agent, or Firm* — Hanley, Flight & Zimmerman, LLC.

(57) ABSTRACT

A method, apparatus and system for, for each of a plurality of image frames, assigning a pattern number to each of a set of pixel neighborhoods within the frame and assigning a relationship number to each of a plurality of sets of pattern numbers based on a probability of transitioning between different pattern numbers in the set of pattern numbers when transitioning between different pixel neighborhoods. For a subset of the plurality of frames, the subset of frames may be determined to be similar, for example, based on the similarity of the relationship numbers of the subset of the plurality of frames. Other embodiments are described and claimed.

23 Claims, 6 Drawing Sheets

DEVICE, SYSTEM, AND METHOD FOR INDEXING DIGITAL IMAGE FRAMES

BACKGROUND OF THE INVENTION

Digital video files may include a large number of individual image frames. Manually sorting or retrieving specific image frames may be an overwhelming task for a user. Thus, indexing mechanisms have been developed to automatically mark, group, or catalogue image frames for users to search, browse, and sort frames with greater ease.

A number of representative or index frames may be extracted or generated from a video file. Each index frame may represent one or more (typically several) consecutive similar image frames, such as a video clip, act, or scene. Index frames may be extracted or generated based on the amount of change between consecutive frames in the video files.

One mechanism for determining the amount of change between frames is the local binary pattern (LBP) system. The LBP assigns numbers individually to each pixel in each frame. The pixel numbering for each pixel may indicate a pattern of surrounding pixels corresponding to histogram values thereof. If the difference in the numberings of corresponding pixels of each of a group of frames is less than a predetermined threshold, one of the frames may be extracted as an index frame, representative of the group. The LBP may compare each pixel numberings for corresponding pixels in each frame of the group of frames. Thus, a huge amount of numbers (e.g., equal to the number of pixels in a frame) may be compared to determine differences between frames. This individual pixel by pixel comparison may be a computationally intensive task.

Additionally, technological advances in image or video capture and storage techniques have resulted in an increased amount of image data for video files. Thus, standard mechanisms, such as the LBP, may require further computational effort to differentiate images for indexing video files.

BRIEF DESCRIPTION OF THE DRAWINGS

The subject matter disclosed in this application is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings in which:

Figure 1:
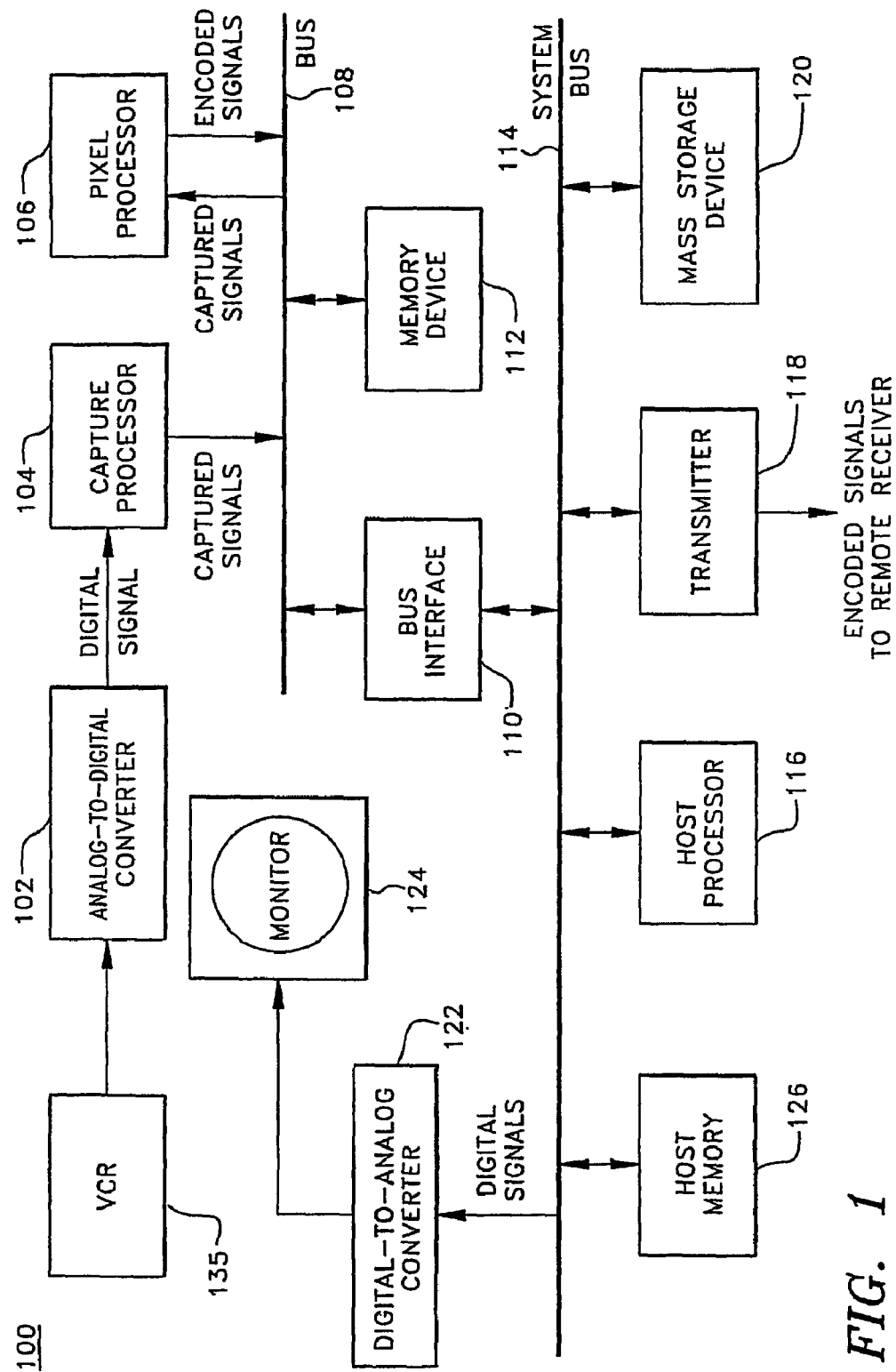
FIG. 1 is a schematic illustration of a system according to an embodiment of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However it will be understood by those of ordinary skill in the art that embodiments of the present invention may be practiced without these specific details. In other instances, well-known methods, procedures, components and circuits have not been described in detail so as not to obscure embodiments of the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the present invention may be used in a variety of applications, such as, for example, image processing, image/video annotation, video summarization, scene understanding, visual surveillance, digital home entertainment, vision based smart health care, computer vision, multimedia related applications such as face recognition, image/video categorization and retrieval, query-by-example (QBE), and the like. Although the present invention is not limited in this respect, the circuits and techniques disclosed herein may be used in many apparatuses such as personal computers (PCs), wireless devices or stations, video or digital game devices or systems, image collection systems, processing systems, visualizing or display systems, digital display systems, communication systems, and the like.

Various techniques may be used to determine which image frames to select as index or other representative frames or images. In one embodiment, a plurality of pixels may be received for two or more image frames. A pattern may be determined for each of the pixels, for example, in each of two or more (e.g., a hue, saturation, color value) color spaces. Numbers may be assigned to the frames, where each number indicates a spatial distribution of multiple patterns for each combination of the patterns determined. The numbers for the frames may be compared. When the numbers are significantly similar, an index frame or image may be selected, for example, from one of the two or more frames, to represent the similar image frames.

Reference is made to FIG. 1, which schematically illustrates a system according to an embodiment of the invention.

System 100 may, among other functions, process and encode video files, such as digital video files, having one or more image frames. System 100 may perform a pre-scan of the video files to extract representative index frames or images, store the index frames and present them to a user. System 100 may extract a frame for example depending on the amount of change in the frame relative to other consecutive frames in the video file. The index frames may form a video database index, e.g., a video database comprising index frames representative of the pre-scanned video file.

In conventional systems, (e.g., using LBP numbering) each pixel in a frame may be individually assigned a separate pattern number. The pattern number for each pixel may identify a single pattern of other pixels in a neighborhood surrounding the pixel. The pattern number may be assigned to each such set of pixel neighborhoods within the frame. The pixel numberings for corresponding pixels of frames are then individually compared for determining an amount of change between the frames.

According to embodiments of the invention, multiple patterns of multiple pixels may be concurrently numbered reducing the overall amount of numbering data and the number of comparisons for determining an amount of change between the frames. In one embodiment, a relationship number may be assigned to each set of pattern numbers having a certain relationship. For example, each relationship number may describe a spatial distribution of multiple pixel neighborhoods to which each of the patterns for each combination of patterns in an image are assigned.

System 100 may include an analog-to-digital (A/D) converter 102 for receiving analog video image signals from a video database source, such as a video source 135, and converting the analog video image signals into the digital video files. It will be understood by those skilled in the art that the video source 135 may be any suitable source of digital or analog video signals, e.g., a video or image playback device such as a digital video disc (DVD), video cassette recorder (VCR), digital video recorder (DVR), a digital VCR, etc. It will be understood by those skilled in the art that an A/D converter may not be needed. It will be understood by those skilled in the art that any analog signal or device described herein may instead be a digital signal or device.

Capture processor 104 may receive, capture, and/or store (e.g., in memory device 112 via a bus 108) the digital video files, for example, as sub-sampled or individual image frames. Alternatively, the digital video files may be stored without sub-sampling, for example, for higher image quality. Image data may be represented by a multi-dimensional color space, such as, for example, a hue, saturation, color value (HSV) color space. The HSV color space may also be referred to as the hue, saturation, brightness (HSB) color space, the hue, saturation, intensity (HSI) color space, the hue, saturation, lightness (HSL) color space and/or other terms. Each image frame in a video file may be represented by a set of multi-dimensional component planes or pixel bitmaps. Each pixel in a frame may be represented, for example, by a multi-component value vector. Although the HSV color space is used to describe embodiments of the invention, it may be appreciated by those skilled in the art that other multi-dimensional spaces or other techniques may be used, for example, including, but not limited to: red, green, and blue (RGB); luminance, red-cyan, and magenta-green (YIQ); luminance, blue, and red (YUV); cyan, magenta, yellow, and black (CMYK); red, green, blue, alpha (RGBA); and the like. Although three dimensional color spaces (e.g., the HSV color space) are used to describe embodiments of the invention, it may be appreciated by those skilled in the art that spaces having other numbers of dimensions (e.g., four dimensions, such as the CMYK or RGBA spaces) may be used.

Pixel processor 106 may access (e.g., HSV or other) bitmap representations of image frames from memory device 112 via bus 108. Pixel processor 106 may select index frames from the processed image frames, as described herein. The selected index frames are typically encoded for compression purposes before being stored in a mass storage device such as mass storage device 120. Pixel processor 106 may generate encoded index frames. Each index frame may represent a different scene or moving image portion. Each different scene or portion may include a plurality of image frames. Depending upon the particular encoding method implemented, pixel processor 106 may apply a sequence of compression techniques to reduce the amount of data used to represent the information in each index frame. The encoded index frame may then be stored in memory device 112 via bus 108 for transmission to host processor 116 via bus 108, bus interface 110, and system bus 114 for storage in mass storage device 120. Mass storage device 120 may include a video database index which may be utilized as an index by a user, as described herein, to locate specific images or events within the video file. Those skilled in the art will appreciate that system bus 114 and bus 108 may be merged into a single system bus. In some embodiments, host processor 116 and pixel processor 106 may be merged into a single processor. The set of components and arrangement of components shown in FIG. 1 is one example only, and other embodiments may carry out the functionality described herein using different components or computing devices. For example, in alternate embodiments, bus(es) 108 and/or 114 may be point-to-point connections or other internal communications hardware and software, for transferring information. In other embodiments, pixel processor 106 and/or host processor 116 may have single-core, multi-core, or a symmetric multiprocessing (SMP) architectures.

Host processor 116 may be utilized to decode encoded index frames previously encoded and/or stored in mass storage device 120. The index frames may be displayed on a monitor 124, for example, to be viewed by a user. Host processor 116 may receive encoded index frames from mass storage device 120 via system bus 114. Host processor 116 may temporarily store encoded index frames in a host memory 126. Host processor 116 may include one or more processors or controllers, such as central processing units (CPUs).

Host processor 116 may decode the encoded index frames. Decoding the encoded index frames may involve undoing the compression processing executed by pixel processor 106. In some embodiments, decoding and decompression need not be used, and access by a processor to image frames may be performed in another manner. Host processor 116 may process the frames, for example may scale the decoded index frames for display. Scaling the decoded index frames may include scaling component signals to a display size and/or adapting a resolution to be different from that of the original captured video files. Host processor 116 may store the scaled and/or decoded index frames in the host memory 126. Host processor 116 may transmit the index frames to digital-to-analog (D/A) converter 122 via system bus 114. D/A converter may if needed convert the digital scaled decoded index frames to analog image signals for display on monitor 124. Alternatively, the frames may be converted once from digital to analogue and then again from analogue to digital. Other analogue-to-digital and digital-to-analogue conversion steps may be used. Alternatively, no conversion steps may be used and the frames may be displayed without decoding as digital image signals on a digital monitor 124.

System 100 may be or include a general microprocessor-based personal computer (PC), a workstation, or another type of computing system. System 100 may include a plug-in board, for example, for executing video processing operations. A/D converter 102 may be any suitable structure for decoding and/or digitizing analog video image signals. Capture processor 104 may be any processor suitable for capturing and/or using digitized video image component signals (e.g., HSV component planes or pixel bitmaps) as sub-sampled image frames. Pixel processor 106 may be any suitable device for encoding and/or processing sub-sampled image frames. Memory device 112 may be any suitable computer memory device, or multiple such devices, such as, for example, a dynamic random access memory (DRAM) device. Bus 108 may be any suitable digital signal transfer device, such as, for example, an industry standard architecture (ISA) bus or extended ISA (EISA) bus or a peripheral component interface (PCI) bus. Bus interface 110 may be any suitable structure for interfacing between bus 108 and system bus 114. Different bus architectures within a computer system and within a processor may be used. In one embodiment, A/D converter 102, capture processor 104, pixel processor 106, bus 108, bus interface 110, and/or memory device 112 may be contained in a plug-in board, capable of being added to a general microprocessor-based PC system. Alternatively, A/D converter 102, capture processor 104, pixel processor 106, bus 108, bus interface 110, and/or memory device 112 may be integral to the general microprocessor-based PC system.

Host processor 116 may be any suitable structure for controlling and/or executing the operations described herein. Host memory 126 may be any suitable memory device such as, for example, a random access memory (RAM), a DRAM, and/or read-only memory (ROM). System bus 114 may be any suitable digital signal transfer device, such as, for example, a PCI, ISA and/or EISA bus. Mass storage device 120 may be any suitable structure for storing digital signals, such as, for example, a computer hard disk drive and/or a compact disk (CD) ROM (CD-ROM) device. Mass storage device 120 may also include a digital or analog video recorder to record video signals. Transmitter 118 may be any suitable structure for transmitting digital signals to a remote receiver using, for example, a telephone line, RF antenna, local area network, and/or remote area network. It will be understood by those skilled in the art that a transmitter may not be needed. D/A converter 122 may be any suitable structure for converting digital image signals to analog image signals. Monitor 124 may be any structure for displaying analog image signals. Video source 135 may be any structure suitable for transmitting analog video signals representative of stored images to analog-to-digital converter 102.

Index frames or other representative frames may be selected from a plurality of ordered image frames constituting a video file, for example, based on the amount of change the image frame exhibits when compared to other (e.g., consecutive, sequential or neighboring) image frames in the file. Thus, each index frames may distinguish, mark, or catalogue different scene, sequence of images, or a video shot within the video file. As will be understood by those skilled in the art, an index frame may be considered "representative" of image frames or video sequences or portions corresponding thereto in that a user may recognize the represented image frames or video sequence by viewing the index frame. Thus, a user familiar with a particular scene may be reminded of the scene when viewing the corresponding index frame. Those skilled in the art will appreciate that some video sequences or portions or video files may include a single image frame, although video sequences or video files typically consist of a plurality of image frames.

Various techniques may be used to determine, for each of a plurality of image frames, which subset of the frames are similar. In one embodiment, a plurality of pixels of the plurality of image frames may be received. A pattern number may be determined for each pixel in each of two or more (e.g., a hue, saturation, color value) color spaces. The pattern number for each pixel may correspond to a property of surrounding pixels. For example, histogram values of the surrounding pixel may be compared to the histogram value for each (e.g., center) pixel. The pattern number may correspond to the relative histogram values. A relationship number may be determined and/or assigned to each set of pattern numbers having a certain relationship, for example, a spatial relationship. For example, each relationship number may indicate a spatial distribution of multiple patterns for each combination of the patterns determined. For each of a plurality of image frames, a subset of the plurality of frames may be determined to be similar, for example, based on the similarity of the relationship numbers thereof. An index frame may be selected from among the similar subset of the plurality of frames to represent the frames.

Figure 2:
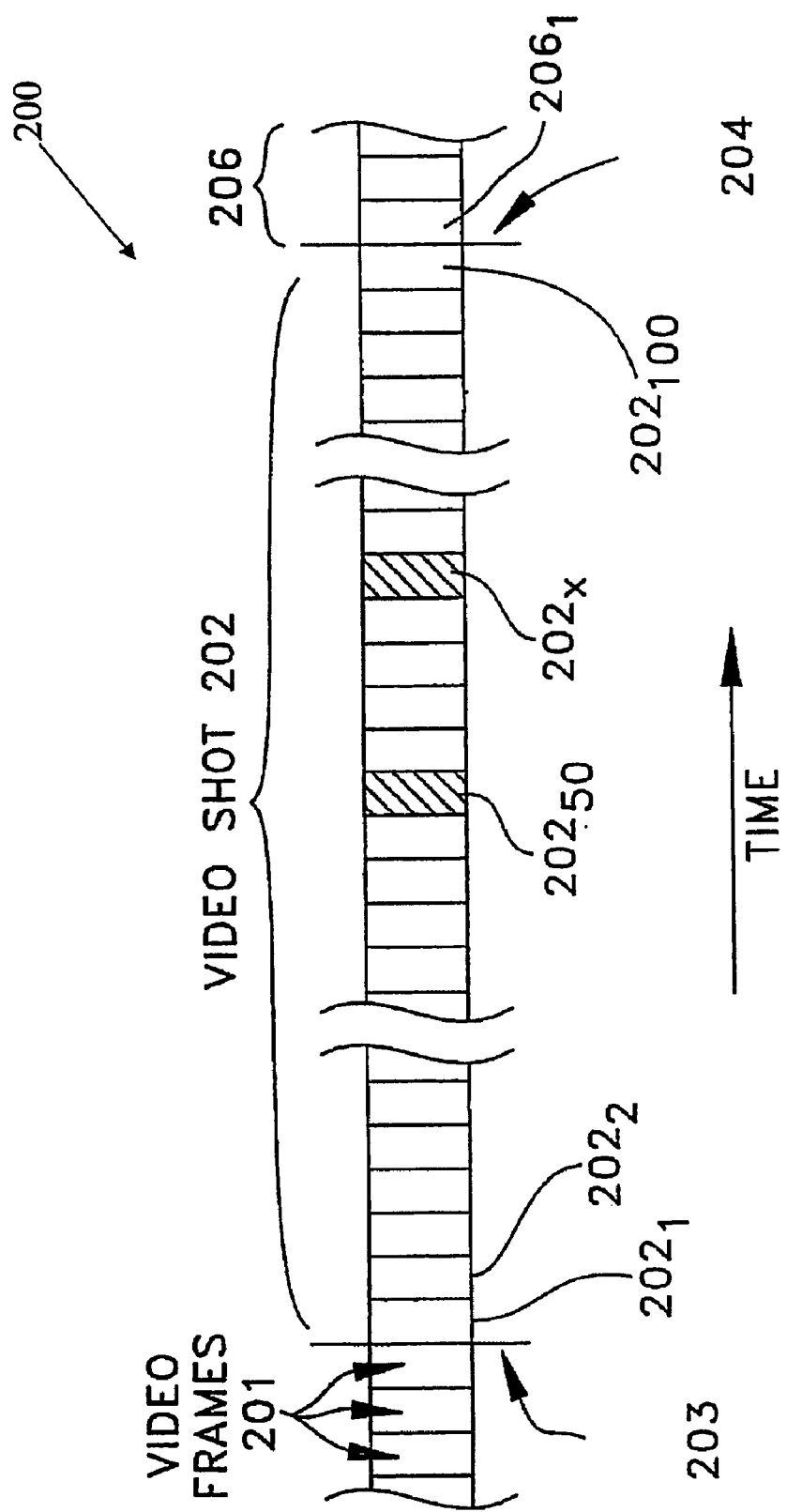
FIG. 2 is a schematic illustration of video segment of a video file according to an embodiment of the invention.

Reference is made to FIG. 2, which schematically illustrates a video portion or segment 202 of a video file 200 according to an embodiment of the invention. Video file 200 may include multiple such segments or portions. Video portion, "shot" or segment 202 may be defined as the set or sequence (e.g., having an ordering) of similar video frames $202_1$-$202_{100}$ between two scene boundaries 203, 204. Scene boundaries 204 may be detected, for example, by determining an abrupt difference between video frames $202_{100}$ and $206_1$, or by detecting a fade-in and fade-out or other typical scene transition. Each such video segment 202 in video file 200 may be represented by an index frame. Video segment 202 may include an ordered sequence of multiple (e.g., 100) video frames $202_1$-$202_{100}$. Any of the multiple video frames $202_1$-$202_{100}$ may be set as the index frame that will represent video segment 202. For example, the first video frame $202_1$, the last video frame $202_{100}$, or a middle or midpoint video frame $202_{50}$, may be selected as the index frame to represent video shot 202.

Each such index frame may be part of an index file or database. The index file and video file 200 may coexist and all or portions of these files may be displayed at once on monitor 124 (FIG. 1). When an index frame of the index file is displayed, the corresponding video segment 202 represented thereby is also displayed, or may be displayed after a user indicates that a video portion corresponding to an index or representative frame should be displayed. In one embodiment, a user may select index frames to retrieve and view the corresponding video segment 202. When a user scans an index file viewing selected index frames, the user may recognize the video segment 202 represented thereby. In another embodiment, a user may adjust, edit, change histograms, brightness, or contrast, or otherwise manipulate an index frame to apply corresponding changes to the video segment 202 represented thereby.

Because transitions, fades, and the like often occur near scene cuts or transitions, a video frame centered between the endpoints of a video shot, such as frame $202_{50}$, may be more representative of the average content of video segment 202 than the video frames near the scene boundaries 203, 204. Alternatively, an index frame $202_x$ between frames $202_1$ and $202_{100}$ may be chosen such that the difference between frame $202_x$ and frame $202_1$ is approximately equal to the difference between frame $202_x$ and frame $202_{100}$. Frame $202_x$ may represent a "difference-centered" video frame between the beginning and ends of video segment 200, rather than a "time-centered" frame $202_{50}$.

Various mechanisms for determining the amount of change or difference between frames may be used.

A pattern (e.g., $c_i$) may indicate a "texture" or other property of a pixel neighborhood in each of a plurality of frames. The patterns and relationships therebetween of each frame, which describe properties of the frame, may be numbered as pattern numbers and relationship numbers, respectively. Thus, the numbers may be compared for determining which of a subset of the plurality of frames are similar.

An index frame may be generated or selected from among the similar subset of frames to represent the frames. The index frame may be a first, last, or center-most frame of the similar subset of frames. The index frame may be a frame having numbers that average the numbers of other frames in the subset. Other index frames may be used. In some embodiments, the index frame may not be one of the frames in the subset, video segment 202, and/or video file 200. The index frame may be stored, for example, in memory such memory device 112 and/or host memory 126 (FIG. 1). The index frame may be presenting to user, for example, on a monitor such as monitor 124 (FIG. 1).

The pixel numbering for each pixel may indicate a pattern of surrounding pixels corresponding to histogram values thereof. If the difference in the numberings of corresponding pixels of each of a group of frames is less than a predetermined threshold, one of the frames may be extracted as an index frame, representative of the group.

Figure 3:
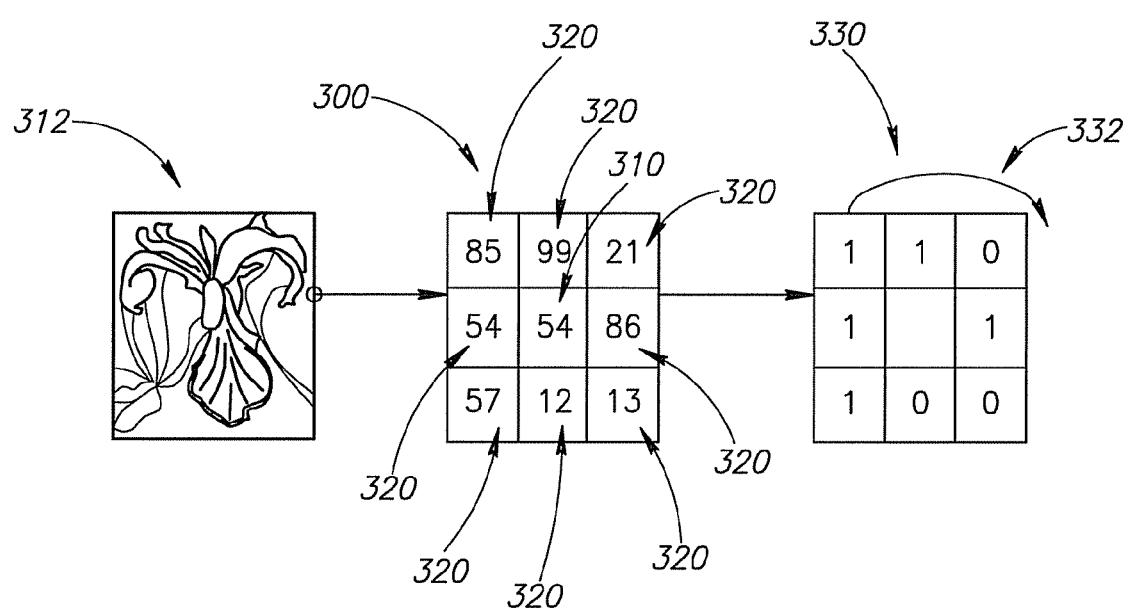
FIG. 3 is a schematic illustration of a process for determining a pattern for each pixel in an image frame according to an embodiment of the invention.

Reference is made to FIG. 3, which schematically illustrates a process for determining a pattern $c_i$ for each pixel $p_i$ 310 in an image frame 312, according to an embodiment of the invention.

A pattern $c_i$ may be defined in a neighborhood 300 of the pixel $p_i$ 310. A neighborhood 300 of each pixel 310 may be defined by two or more immediately neighboring pixels 320. Neighboring pixels 320 may include the (e.g., eight) adjacent pixels touching the "center" pixel 310. In other embodiments, neighboring pixels 320 may include the (e.g., four) facing pixels that are adjacent to and that share a face with the center pixel 310 (e.g., pixels to the top, bottom, left, and right). In other embodiments, neighboring pixels 320 may include the (e.g., four) diagonal pixels that are adjacent and that share a corner with the center pixel 310. Other pixels may be considered to be neighboring the pixel 310, for example, which are less that a predetermined distance (e.g., two or three pixel lengths) away from the pixel 310 and/or the pixel 310 itself. In other embodiments, a user may select, set, or alter a neighborhood, for example, by dragging a cursor across a pixilated image displayed on a screen. Other neighborhoods may be defined, such as "circular" neighborhoods as is known in the art.

The pattern $c_i$ for each pixel $p_i$ 310 may be based on a comparison of histogram values or other measurements of each of the neighboring pixels 320, for example, with the histogram values of the (e.g., center) pixel $p_i$ 310. For example, the pattern $c_i$ may include a number or code.

In one embodiment, initially, a (e.g., histogram) value for each of pixel $p_i$ 310 and the neighboring pixels 320 may be determined, retrieved or otherwise obtained. For the example shown in FIG. 3, the value for the center pixel $p_i$ 310 is 54 and the value for each of the neighboring pixels 320 (e.g., starting with the upper left corner pixel) taken in a direction 332 (e.g., clockwise) is 85, 99, 21, 86, 13, 12, 57, and 54.

A code representation 330 may be generated in which each neighboring pixel 320 may be assigned a (e.g., binary) code indicating (e.g., a "1") if the value for the neighboring pixel 320 is greater than or equal to the value for the center pixel 310 or (e.g., a "0") if the value for the neighboring pixel 320 is less than the value for the center pixel 310. For the example shown in the figure, the binary code for each of the neighboring pixels 320 (e.g., starting with the upper left corner pixel and going clockwise) is 1, 1, 0, 1, 0, 0, 1, and 1. Alternatively, a "1" may indicate less than and a "0" may indicate greater than or equal to.

The (e.g., binary) codes for the neighboring pixels 320 may be summed or collected to generate a (e.g., binary) sequence. Starting at one of the neighboring pixels 320 (e.g., the upper left corner pixel), the values of each of the neighboring pixels 320 may be added to a numerical sequence. For the example shown in the figure, the numerical sequence is 11010011.

The numerical sequence may be converted (e.g., from a base-2 or binary numeral system to a base-10 or decimal numeral system) to a pattern $c_i$ number for each pixel $p_i$ 310. For the example shown in the figure, the numerical sequence is 11010011 may be converted to the pattern $c_i$ number 211. For example, when eight binary codes are used, there may be 256 distinct patterns $c_i$ numbers.

The number (e.g., 256) of distinct pattern $c_i$ numbers may be reduced (e.g., to 59) by a "uniform" LBP operator. For example, each numerical sequence may be rotated by, for example, at most 2 bits (e.g., one-to-zero or zero-to-one transitions). Some sequences may remain the same after the rotation. For example, 256 unique numerical sequences may correspond to, for example, 59 unique rotated or "uniform" sequences. A look-up-table may be used to map the 256 numerical sequences to the 59 uniform sequences.

Other values or numbers may be used.

Figure 4:
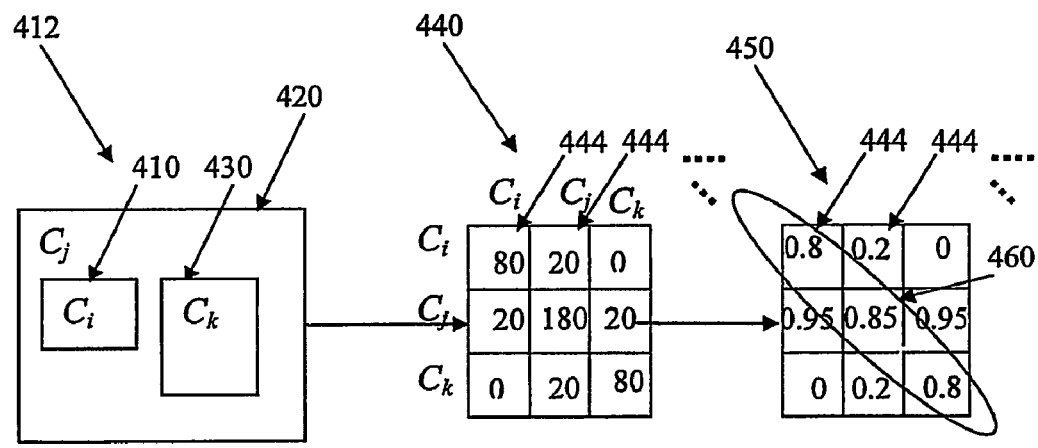
FIG. 4 is schematic illustration of a process for determining the co-occurrence of multiple patterns in an image according to an embodiment of the invention.

Reference is made to FIG. 4, which schematically illustrates a process for assigning a relationship number 444 to each of a plurality of pattern numbers $c_i$ 410, $c_j$ 420, and $c_k$ 430, in an image 412, according to an embodiment of the invention. Embodiments of the invention may assign numberings corresponding to the multiple patterns for concurrently characterizing multiple pixels, for example, for consolidating pixel representations. Images having the same or similar may be grouped together and referenced by the same index frame. For example, there may be 354 relationship numbers to characterize the relationship between each set of pattern numbers.

In conventional systems, (e.g., using LBP numbering) each pixel may be individually numbered by a pattern number for identifying a single pattern thereof.

According to some embodiments of the invention, each relationship number may describe a set or combination of pattern numbers having a certain relationship. The certain relationship may be a spatial relationship of the sets of pixel neighborhoods to which the plurality of pattern numbers for each of a plurality of combinations of the pattern numbers are assigned. Each relationship number may describe a spatial relationship (e.g., a neighborhood or pre-set distance) of the multiple patterns. Each relationship number may describe the patterns for each of multiple properties (e.g., hue, saturation, and color value). The relationship numbers may provide a compact and accurate mechanism for differentiating patterns in an image frame. Embodiments of the invention may use, for example, 354 different relationship numbers (e.g., a feature dimension of 354) for characterizing each image frame. Other amounts of relationship numbers may be used.

It may be appreciated by those skilled in the art that a relationship number 444 may include any single number, plurality of numbers, code, or entry, representing a set or combination of patterns or pattern numbers having a certain relationship. Accordingly each of an entry, $c_{ij}$, of a spatial co-occurrence matrix 440, an entry, $p_{ij}$, of a Markov transition matrix 450, an initial distribution, $\pi(0)$, a stationary distribution, $\pi$, and/or variations or combinations thereof, may be a relationship number. Other relationship numbers may be used.

In order to determine a relationship number for multiple patterns $c_i$ and $c_j$, the data in the image 412 may be initially processed for preparation. For example, each pixel in the image 412 may have different properties, such as, hue, saturation, color value and/or RGB or CMYK brightness. Other properties may be used. The image 412 may be transferred or mapped to a multi-dimensional (e.g., three-dimensional) color space. Each pixel in the color space may be defined, for example, by multiple (e.g., three) coordinates (e.g., hue, saturation, color value).

The image 412 data for the multi-dimensional color space may be sub-divided or split into one-dimensional spaces (e.g., or "channels"). The split data may include a hue image, a saturation image, and a color value image, defined by each pixel in the image 412.

For each channel, a process (e.g., as described in reference to FIG. 3) may be used to determine a pattern number $c_i$ for each pixel in the image 412. Adjacent and similar patterned neighborhoods may be joined as one neighborhood. For the example shown in FIG. 4, there are three distinctly patterned neighborhoods $c_i$, $c_j$, and $c_k$, 410, 420, and 430. Other configurations, definitions, or numbers of neighborhoods may be used.

A spatial co-occurrence matrix 440, C, may include relationship numberings, $c_{ij}$, representing each set of patterns or pattern numbers having a certain relationship. Each number, $c_{ij}$, may describe a spatial relationship (e.g., a neighborhood or pre-set distance) of the multiple patterns. For example, each entry $c_{ij}$ of the spatial co-occurrence matrix 440, C, may represent that each pair of patterns $c_i$ and $c_j$ for pixels (e.g., $p_1$ and $p_2$, respectively) may be spaced apart by a predetermined distance (e.g., d). The spatial co-occurrence matrix 440, C, may be defined for each channel of the image 412 as $C=(c_{ij})_{K \times K}$, where $c_{ij}=\#(p_1=c_i, p_2=c_j \| p_1-p_2 \| =d)$, in which d is the distance between two pixels $p_1$ and $p_2$ in the image 412. In other embodiments, the co-occurrence $c_{ij}$, may be defined, as for example:

$$c_{ij}=\#(p_1=c_i, p_2=c_j \| p_1-p_2 \| \leq d) \text{ or } c_{ij}=\#(p_1=c_i, p_2=c_j \| p_1-p_2 \| \geq d).$$

Alternatively, relationship numbers, $c_{ijk}$, may be used to describe sets of three patterns, for example, as follows:

$$c_{ijk} = \#\left(p_1=c_i, p_2=c_j, p_3=c_k \left| \sum_{i=1}^{3}\left(p_i - \frac{p_1+p_2+p_3}{3}\right) \leq d\right.\right).$$

A 3D matrix may be used to represent the $c_{ijk}$ values. Other definitions and data arrangement (e.g., different from matrices) may be used. Any value for the distance, d, may be used, such as, for example, 1.

When patterns $c_i$ and $c_j$ have a relatively large relationship number, $c_{ij}$, the probability that $c_i$ transitions to $c_j$, is typically relatively high. Alternatively, the relationship number may be defined such that a relatively large relationship number indicates a low probability. The spatial co-occurrence matrix 440, C, may be computed for each channel (e.g., hue, saturation, and color value, respectively).

For the example shown in FIG. 4, the spatial co-occurrence matrix 440, C, relationship numbers $c_{ij}$, for patterns $c_i=A$ and $c_j=A$ is 80, $c_i=A$ and $c_j=B$ is 20, $c_i=A$ and $c_j=C$ is 0, and so on. It may be observed that since within a pattern, where $c_i=c_j$, all points have the pattern $c_i$ and $c_j$, the spatial co-occurrence matrix 440 relationship numbers $c_{ij}$, is the number of points spaced by a distance d (e.g., 80 for $c_i=c_j=A$, 180 for $c_i=c_j=B$, and 80 for $c_i=c_j=C$). Thus, in the example shown in the figure, the largest spatial co-occurrence matrix 440 relationship numbers $c_{ij}$, is for the largest region, $c_i=c_j=B$.

A Markov chain may be used in which the pattern numbers, $c_i$ and $c_j$, may be considered as states of a Markov chain and the relationship numbers, $c_{ij}$, may be the probability of transitioning between the patterns for pixels of image 412 spaced a distance d apart. A Markov chain may include a sequence of random observed variables $\{X_n, n \geq 0\}$ having a Markov property, for example, that the probability distribution of current states is conditionally independent of past states. The Markov property may be formally written as, for example, $p(X_{n+1}|X_n, \ldots, X_1)=p(X_{n+1}|X_n)$. All possible values of the random observed variables $X_n$ may form a countable set S, which may be referred to as the "state space" of the Markov chain. For a K-level image 412 (e.g., having K different patterns numbers, $c_1, \ldots, c_K$), the state space of the Markov chain may be denoted as, for example, $S=\{c_1, \ldots, c_K\}$.

A Markov chain may depend on a Markov transition matrix 450, denoted herein by P. The Markov transition matrix 450, P, may be defined by transition probabilities, $p_{ij}$, for example, as $P=(p_{ij})_{K \times K}$. Transition probabilities, $p_{ij}$, may indicate a certain relationship, for example, a probability of transitioning between patterns $c_i$ to $c_j$ for the patterns. Transition probabilities, $p_{ij}$, may be defined, for example, as $p_{ij}=p(X_1=c_j|X_0=c_i)$. The Markov transition matrix 450, $P=(p_{ij})_{K \times K}$, may, for example, obey the following properties: (1) $p_{ij} \geq 0$, $\forall c_i \in S, c_j \in S$ and/or (2) $\Sigma_{j=1}^{K} p_{ij}=1$. Therefore, the transition probability $p_{ij}$ may be obtained from the spatial co-occurrence matrix $C=(c_{ij})_{K \times K}$ to be, for example, $p_{ij}=c_{ij}/\Sigma_{j=1}^{K} c_{ij}$. The Markov transition matrix 450, P may be computed for each channel (e.g., hue, saturation, and color, respectively). For the example shown in the figure, the Markov transition matrix 450 transition probabilities, $p_{ij}$, for patterns $c_{ii}=0.8$ and $c_{ij}=0.2$, $c_{ik}=0$, and so on.

A Markov chain may depend on an initial distribution, $\pi(0)$. The initial distribution $\pi(0)$ may be a relationship number indicating a certain relationship, for example, an initial probability of changing between patterns $c_i$ and $c_j$ in the Markov chain for the patterns. The initial distribution $\pi(0)$ may be defined, for example, by the diagonal elements 460 of the Markov transition matrix 450 P normalized to unit length. The initial distribution $\pi_H(0)$, $\pi_S(0)$, $\pi_V(0)$ may be computed for each channel (e.g., hue, saturation, and color, respectively). For the example shown in the figure the initial distribution $\pi(0)$ is, for example, (0.332, 0.336, 0.332).

A distribution, $\pi$, may be referred to as a "stationary distribution" when $\pi=\pi P$. The stationary distributions may be a relationship number indicating a certain relationship, for example, an average probability of changing between patterns $c_i$ and $c_j$ in a Markov chain for the patterns. The stationary distribution is typically an invariant measure and compact representation of the Markov chain. The existence and uniqueness of the stationary distribution may for example be shown by the following fundamental limitation theorem:

Theorem 1: The limitation $$A = \lim_{n \to \infty} (I + P + P^2 + \ldots + P^n)/(n+1),$$

where P is the Markov transition matrix 450, exists when the state space, S, of a Markov chain is a countable set. When the Markov chain is regular, A is a matrix whose rows are equal to a unique probabilistic vector (e.g., the elements are positive and sum to 1).

Using Theorem 1, it may be shown that each row of the matrix A is the stationary distribution for the regular Markov chain. Thus, the stationary distribution may be computed, for example, as follows:

$$\pi = \Sigma_{i=1}^{59} a_i, \text{ where } a_i \text{ is row vector of matrix } A_n = (I + P + P^2 + \ldots + P^n)/(n+1)$$

and the matrix $A_n$ may be an approximation of the matrix A, where n is a finite number.

For the example shown in the figure (e.g., for three patterns $c_i$, $c_j$, and $c_k$) the stationary distribution $\pi$ is, for example, (0.244, 0.512, 0.244). The stationary distributions, $\pi_H$, $\pi_S$, $\pi_V$, may be computed for each channel (e.g., hue, saturation, and color, respectively).

The stationary distribution and the initial distribution may be generated for each of multiple channels (e.g., hue, saturation, and color, respectively), generating multiple (e.g., six) values $\pi_H(0)$, $\pi_H$, $\pi_S(0)$, $\pi_S$, $\pi_V(0)$, $\pi_V$ for the image 412.

Relationship numbers, $\pi_H(0)$, $\pi_H$, $\pi_S(0)$, $\pi_S$, $\pi_V(0)$, $\pi_V$, may be assigned to each of two or more images 412, where each number indicates a spatial distribution of multiple patterns thereof. The numbers for the frames may be compared. For each of a plurality of image frames, a subset of the plurality of frames may have similar numbers. The frames having similar numbers may be grouped together, for example, as a segment (e.g., video segment 202 of FIG. 2). An index frame may be selected from among the similar subset of the plurality of frames to represent the grouped segment.

In one example, if there are multiple (e.g., 59) pattern numbers for each of the multiple (e.g., 6) distributions $\pi_H(0)$, $\pi_H$, $\pi_S(0)$, $\pi_S$, $\pi_V(0)$, $\pi_V$, there may be a total of (e.g., 6×59=354) relationship numbering to assign to each image 412.

Other relationships, properties, distributions, values, and probabilities may be used.

Compared to conventional mechanisms, embodiments described herein may provide a more compact (e.g., using less data) and more accurate (e.g., using spatial relationships) mechanism for numbering and differentiating frames for indexing. Other or different benefits may be used.

Figure 5A:
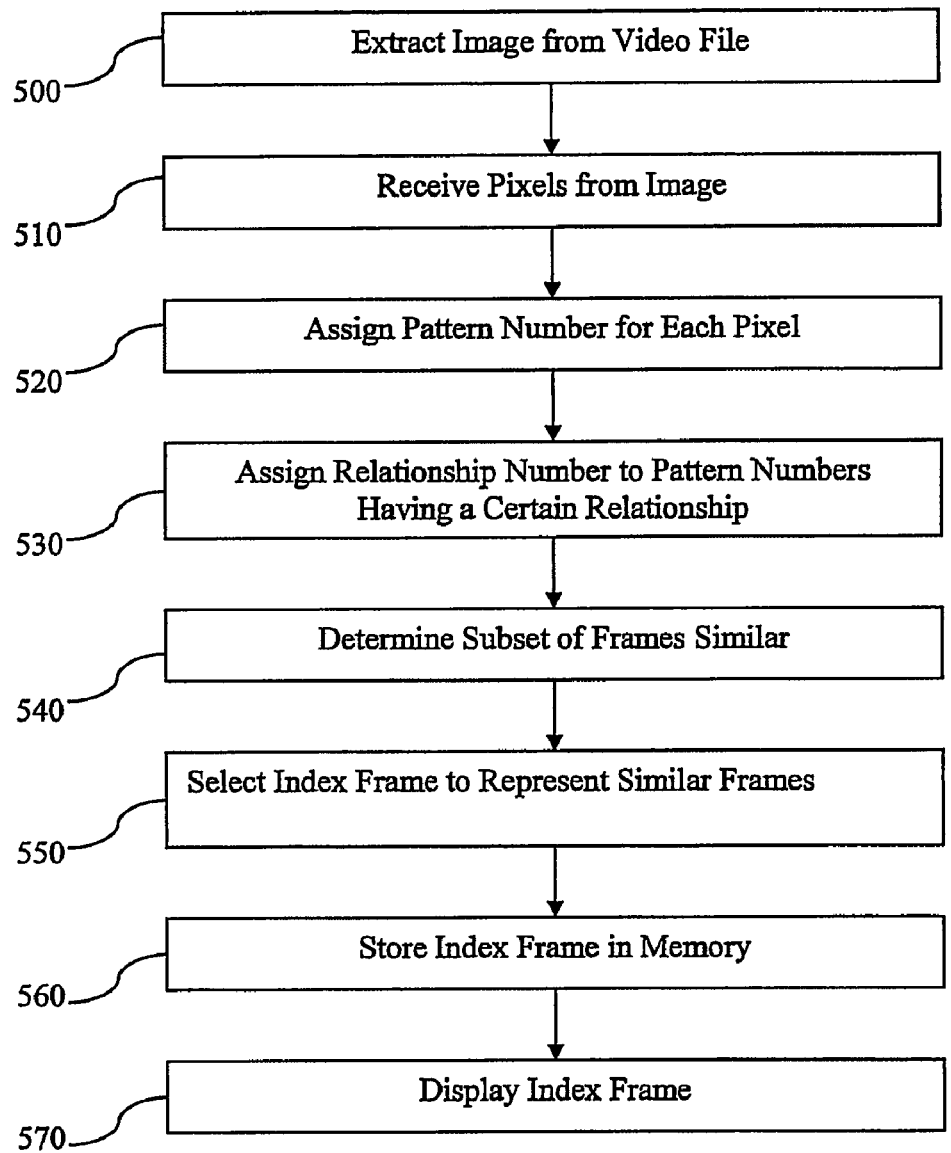
FIGS. 5A and 5B are flow charts of methods according to embodiments of the invention.

Reference is made to FIG. 5A, which is a flowchart of a method according to an embodiment of the invention. Embodiments of the method may be used by, or may be implemented by, for example, system 100 of FIG. 1 or other suitable systems.

In operation 500, an image frame may be extracted from a plurality of image frames, such as a video file. The image frame may be processed for determining an amount of change between the frame and other consecutive frames in the video files. If there is less than a predetermined amount of change between frames, an index frames may be extracted for representing the frames. In one embodiment, each image frame in a video sequence is extracted. In other embodiments, only some images, such as, "key", centered, or representative, frames are extracted.

In operation 510, a plurality of pixels of the extracted image frame may be received. The plurality of pixels may include some or all of the pixels in the frame.

In operation 520, a pattern number may be determined and/or assigned for each pixel. The pattern number for each pixel may correspond to a property (e.g., texture, color, contrast, etc.) of surrounding pixels. For example, histogram values of the surrounding pixel may be compared to the histogram value for each (e.g., center) pixel. The pattern number may correspond to the relative histogram values.

In operation 530, a relationship number may be determined and/or assigned to each of a plurality of sets of pattern numbers based on a probability of transitioning between different pattern numbers in the set of pattern numbers when transitioning between different pixel neighborhoods. For example, each relationship number may indicate a spatial distribution of multiple patterns for each combination of the patterns determined.

In operation 540, a subset of a plurality of image frames, may be determined to be similar. For example, relationship numbers of each of the plurality of image frames may be compared. The relationship numbers of each of the subset of the plurality of image frames may be similar (e.g., having less than a threshold of difference), while the relationship numbers of each of the other frames may be different (e.g., having greater than a threshold of difference).

In operation 550, an index frame may be selected from among the similar subset of the plurality of frames to represent the frames. For example, the index frame may be a first, last, or center-most frame of the similar subset of frames. In another embodiment, the index frame may be generated as an average of values of the similar subset of frames. Other index frames may be used.

In operation 560, the index frame may be stored, for example, in memory (e.g., memory device 112 and/or host memory 126 of FIG. 1). The index frame may be stored in a video database including a plurality of index frames, each of which represents a distinct subset of a plurality of similar image frames. The index frames may be stored in the database in an order corresponding to the order of the image frames which they represent in the video sequence.

In operation 570, the index frame may be displayed and/or presenting to user, for example, on a monitor (e.g., monitor 124 of FIG. 1). Each index frame may be used to access, mark, retrieve, or view the similar subset of frames represented thereby.

Other operations or series of operations may be used.

Embodiments of the invention may provide index or reference frames by identifying neighborhood patterns for each pixel and spatial relationships between two or more of those patterns, within a frame. Frames having spatial relationships between patterns identified to be similar may be grouped and referenced by a single index frames. Frames having spatial relationships between patterns identified to be different may be separated and referenced by distinct index frames. The spatial relationships may be numbered by relationship numbers or otherwise marked for easy comparison thereof among frames. An index frame may be selected for a similar subset of the plurality of frames from among the frames to represent the frames.

Embodiments of the invention may identify the spatial relationship of neighborhood patterns of pixels using, for example, relationship numbers, for example, arranged in a matrix such as the co-occurrence matrix 440 of an image 412. Embodiments of the invention provide a more visually descriptive and compact pixel numberings system for differentiate frames using relationship numbers representing spatial relationships of multiple pixel patterns as compared to conventional mechanisms (e.g., the LBP) which use pattern numbers representing only single pixel patterns.

Figure 5B:
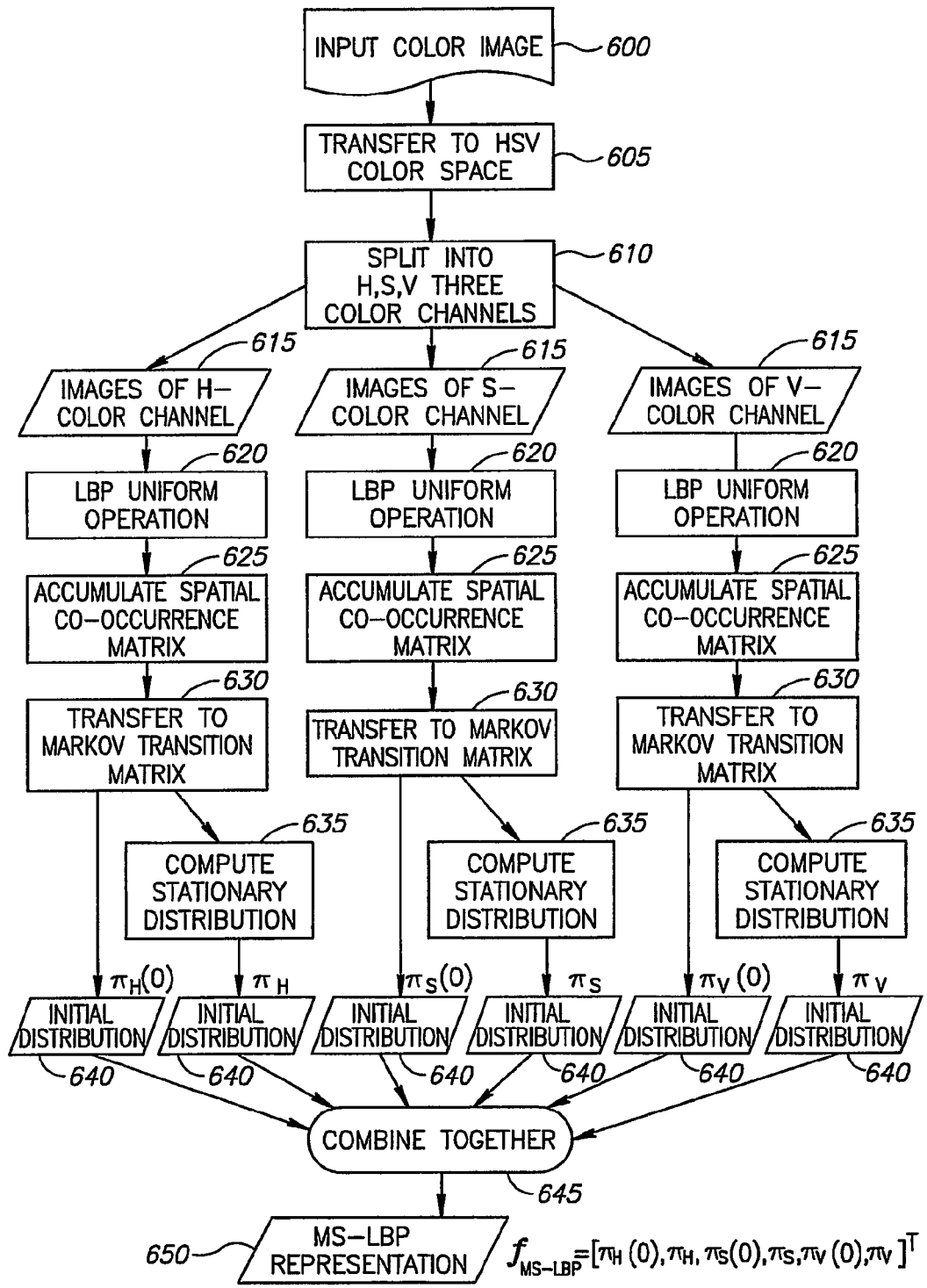

Reference is made to FIG. 5B, which is a flowchart of a method according to an embodiment of the invention. Embodiments of the method may be used by, or may be implemented by, for example, system 100 of FIG. 1 or other suitable systems.

In operation 600, color images may be input into or received by a processor (e.g., into pixel processor 106 of FIG. 1).

In operation 605, the processor may transfer the images into a multi-dimensional (e.g., HSV) color space.

In operation 610, the processor may split the images into multiple single or lesser dimensional (e.g., hue, saturation, and color value, respectively) color spaces.

In operation 615, for each of the color spaces, the processor may generate images for the specific color channel.

In operation 620, for each of the color spaces, the processor may perform a uniform LBP operation on the image generated for the specific color channel. The operation may generate (e.g., 59) pattern numbers for the image.

In operation 625, for each of the color spaces, the processor may accumulate a spatial co-occurrence matrix (e.g., spatial co-occurrence matrix 440). The spatial co-occurrence matrix may include relationship numbers, each of which indicates a spatial distribution of multiple patterns for each combination of the patterns generated using the uniform LBP operation.

In operation 630, for each of the color spaces, the processor may transfer the spatial co-occurrence matrix to the Markov transition matrix for generating a special distribution of the probabilities of transitioning between the multiple patterns, for example, within a predefined space.

In operation 635, for each of the color spaces, the processor may compute a stationary distribution of the Markov transition matrix.

In operation 640, for each of the color spaces, the processor may compute an initial distribution of the Markov transition matrix.

In operation 645, the stationary and initial distributions may be combined together to define a compact representation of the frame, for example, $\pi_H(0)$, $\pi_H$, $\pi_S(0)$, $\pi_S$, $\pi_V(0)$, $\pi_V$, (e.g., six dimensional representation) for each combination of patterns.

In operation 650, a relationship numbering (e.g., 354 numbers) may be determined. The relationship numbering may be stored in a memory (e.g., a DRAM) for each of the plurality of frames.

Embodiments of the invention provide a compact representation of image frames, for example, incorporating spatial structure information based on Markov stationary analysis. The numbering may be extracted in a multi-dimensional (e.g. HSV) color space. In contrast, conventional mechanisms typically use only a one-dimensional histogram (e.g., or grayscale) of values.

Other or different benefits or advantages may be achieved.

Although embodiments of the invention are described in connection with images, video, shapes, frames, histograms, or other graphic or visual data, it may be appreciated by those skilled in the art that such embodiments are not limited in this way. For example, embodiments of the invention may be used to mark or index any array of data, including, but not limited to, audio or sound data, numerical data, data arranged in a spreadsheet, matrix, cache, or other forms. In some embodiments, the processes described herein may be used to identify and index or mark any change in (e.g., a relatively large amount of) data. For example, embodiments of the invention may be used to index or flag a change (e.g., in the modified/exclusive/shared/invalid (MESI) protocol state) of a cache line in cache memory and send a corresponding signal or update. For example, embodiments of the invention may be used to index or flag a change in a power state of a device component and send an update signal to a central power manager. For example, when a new device joins or communicates with a wireless system, embodiments of the invention may be used to index or flag the change in system membership by identifying the new device or system composition to a central manager or individually to other members of the system. Each new cache MESI state, power mode, wireless member, may belong to and change a larger database or collection of data. Each change to the larger collection of data may be indexed (e.g., in time) with codes (e.g., integer or decimal patterns) that may simply identify or index the change.

Embodiments of the invention may include an article such as a computer or processor readable medium, or a computer or processor storage medium, such as for example a memory, a disk drive, or a USB flash memory, encoding, including or storing instructions which when executed by a processor or controller, carry out methods disclosed herein.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

What is claimed is:

1. A method comprising:
   for each of a plurality of image frames, assigning a pattern number to each of a set of pixel neighborhoods within the frame;
   splitting the pixel neighborhoods based on a one dimensional channel type;
   assigning a relationship number to each of a plurality of sets of pattern numbers within each channel type based on a probability of transitioning between different pattern numbers in each one of the plurality of sets of pattern numbers when transitioning between different pixel neighborhoods;
   combining the relationship numbers associated with each channel type to define a compact representation of the frame; and
   determining, for a subset of the plurality of frames, whether the subset of frames are similar based on a similarity of the relationship numbers of the subset of the plurality of frames.

2. The method of claim 1, comprising selecting an index frame from among the subset of frames.

3. The method of claim 2, wherein the subset of frames has an ordering and wherein selecting the index comprises selecting the frame centered between endpoints of the subset of frames.

4. The method of claim 1, wherein each pattern number assigned to one of the pixel neighborhoods corresponds to relative histogram values of pixels in the pixel neighborhood.

5. The method of claim 1, wherein each of the relationship numbers comprises a spatial relationship of the sets of pixel neighborhoods to which the plurality of pattern numbers for each of a plurality of combinations of the pattern numbers are assigned.

6. The method of claim 1, wherein each of the relationship numbers comprises a probability of transitioning among the plurality of the pattern numbers.

7. The method of claim 1, wherein the probability follows a Markov relationship.

8. The method of claim 1, wherein the relationship numbers are assigned for each of a plurality of color spaces of the image.

9. The method of claim 2, comprising displaying the index frame to a user on a display.

10. The method of claim 2, comprising storing the index frame in memory in an index file.

11. The method of claim 1, wherein the channel type comprises at least one of a hue, a saturation, or a color.

12. A system comprising:
a processor to:
assign, for each of a plurality of image frames, a pattern number to each of a set of pixel neighborhoods within the frame;
split the pixel neighborhoods based on a one dimensional channel type;
assign a relationship number to each of a plurality of sets of pattern numbers within each channel type based on a probability of transitioning between different pattern numbers in each one of the plurality of sets of pattern numbers when transitioning between different pixel neighborhoods;
combine the relationship numbers associated with each channel type to define a compact representation of the frame; and
determine, for a subset of the plurality of frames, whether the subset of frames are similar based on a similarity of the relationship numbers of the subset of the plurality of frames.

13. The system of claim 12, wherein the processor is to select an index frame from among the subset of frames.

14. The system of claim 12, wherein the processor is to assign each pattern number to the respective pixel neighborhood based on relative histogram values of pixels in the respective pixel neighborhood.

15. The system of claim 12, wherein each of the relationship numbers comprises a spatial relationship of the sets of pixel neighborhoods to which a plurality of pattern numbers for each of a plurality of combinations of the pattern numbers are assigned.

16. The system of claim 13, further comprising a display to display the index frame to a user.

17. The system of claim 13, further comprising a memory to store the index frame in an index file.

18. The system of claim 12, wherein the channel type comprises at least one of a hue, a saturation, or a color.

19. A tangible machine accessible medium having instructions stored thereon that, when executed, cause a machine to, at least:
for each of a plurality of image frames, assign a pattern number to each of a set of pixel neighborhoods within the frame;
split the pixel neighborhoods based on a one dimensional channel type;
assign a relationship number to each of a plurality of sets of pattern numbers within each channel type based on a probability of transitioning between different pattern numbers in each one of the plurality of sets of pattern numbers when transitioning between different pixel neighborhoods;
combine the relationship numbers associated with each channel type to define a compact representation of the frame; and
determine, for a subset of the plurality of frames, whether the subset of frames are similar based on a similarity of the relationship numbers of the subset of the plurality of frames.

20. The tangible machine accessible medium as described in claim 19, having instructions stored thereon that, when executed, cause a machine to select an index frame from among the subset of frames.

21. The tangible machine accessible medium as described in claim 20, having instructions stored thereon that, when executed, cause a machine to display the index frame to a user on a display.

22. The tangible machine accessible medium as described in claim 20, having instructions stored thereon that, when executed, cause a machine to store in memory the index frame in an index file.

23. The tangible machine accessible medium as described in claim 19 having instructions stored thereon that, when executed, cause a machine to split the pixel neighborhoods based on at least one of a hue, a saturation, or a color.

* * * * *